Oct. 10, 1933.  D. E. WILLETT  1,930,376
WHEEL AND BUMPER SHIELD
Filed June 28, 1932  2 Sheets-Sheet 2
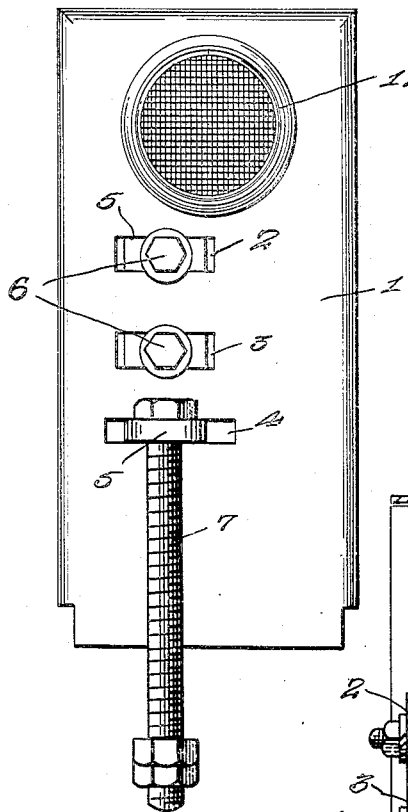
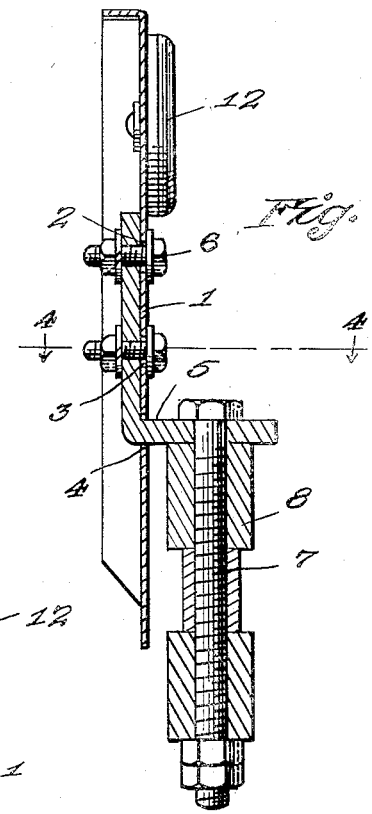
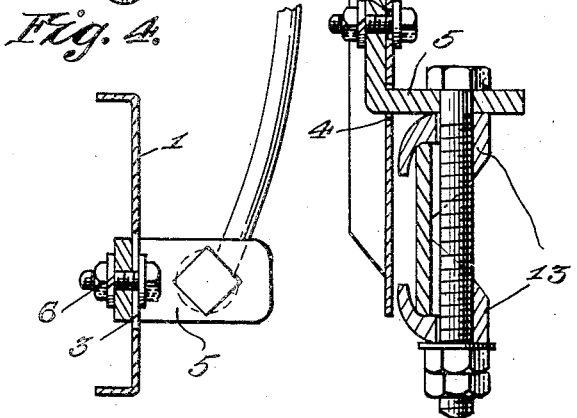
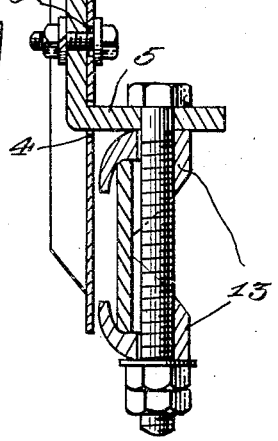
David E. Willett, INVENTOR
BY Victor J. Evans & Co.
ATTORNEY Patented Oct. 10, 1933

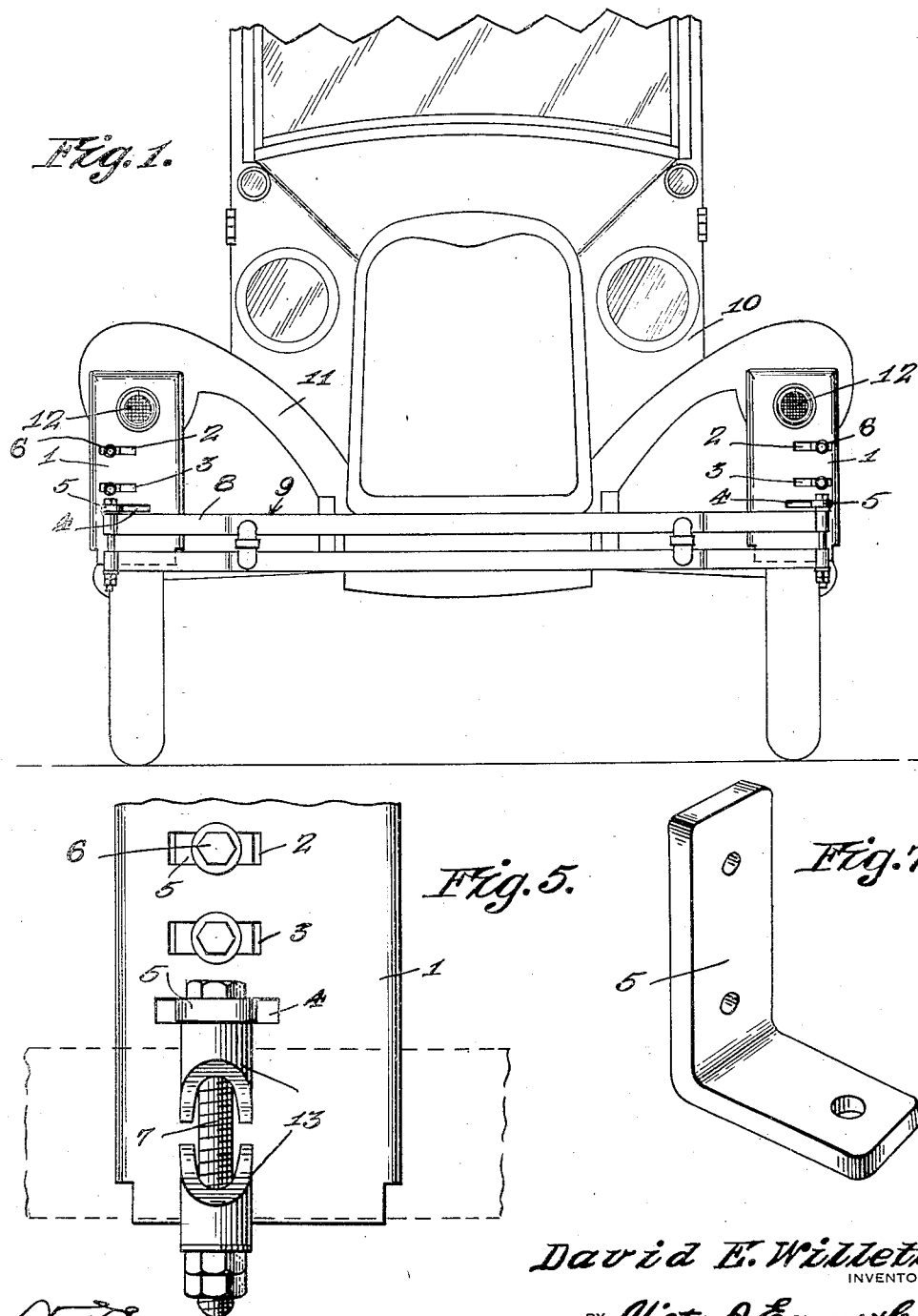

1,930,376

UNITED STATES PATENT OFFICE 1,930,376

WHEEL AND BUMPER SHIELD

David E. Willett, Johnstown, Pa.

Application June 28, 1932. Serial No. 619,778

2 Claims. (Cl. 280—152)

This invention relates to shields for motor vehicles and has for the primary object, the provision of devices of the above stated character which may be easily and quickly attached to the bumpers of a motor vehicle to protect the fenders and wheels of the vehicle and to prevent mud, water and other foreign matter being thrown over the bumpers by the wheels during rotation thereof and further adding to the appearance of the vehicle and providing mediums which will indicate the extreme width of the vehicle at night time to approaching vehicles.

With this and other objects in view, this invention consists in certain novel features of construction, combination and arrangement of parts to be hereinafter more fully described and claimed.

For a complete understanding of my invention, reference is to be had to the following description and accompanying drawings, in which Figure 1 is a fragmentary front elevation illustrating a motor vehicle with shields applied thereto and constructed in accordance with my invention.

Figure 2 is a front elevation illustrating one of the shields.

Figure 3 is a vertical sectional view illustrating the attachment between the shield and the bumper.

Figure 4 is a detail sectional view taken on the line 4—4 of Figure 3.

Figure 5 is a fragmentary front elevation illustrating a modified form of securing means between the shield and the bumper.

Figure 6 is a vertical sectional view illustrating the same.

Figure 7 is a perspective view illustrating an attaching bracket or plate.

Referring in detail to the drawings, the numeral 1 indicates a shield in the form of a substantially rectangular shaped plate provided with slots 2, 3 and 4. An L-shaped bracket 5 has one of its arm portions in engagement with the rear face of the plate 1 and provided with apertures to receive bolts or like fasteners 6 after extending through the slots 2 and 3. The other arm portion of the bracket 5 extends through the slot 4 and is apertured to receive an attaching bolt 7. The attaching bolt 7 is adapted to extend through the ends of bars 8 forming the bumper 9 of a motor vehicle 10 so that the shield is supported vertically in front of the wheel and the front end of the fender 11 of the automobile, giving protection to the wheel and fender and preventing mud, water or the like from being thrown over the bumper 9. The upper portion of the plate or shield 1 carries a deflecting lens 12 of any suitable color adapted to reflect rays of light from approaching vehicles.

With a shield applied to each corner of the motor vehicle by being mounted on the bumpers thereof, approaching vehicles either from the front or back, and at night time may easily determine the extreme width of the respective vehicle by the light rays from the headlamps of the approaching vehicles striking the deflecting lenses 12.

Should it not be convenient to pass the attaching bolt 7 through the bars of the bumper, the attaching bolt may be provided with clamps 13 adapted to receive and grip a bar of the bumper so as to support the shield in a vertical position. By having the slots 2, 3 and 4 in the shield 1 permits the latter to be easily adjusted to align with the wheels and ends of the fenders of the vehicle.

While I have shown and described the preferred embodiment of my invention, it will be understood that minor changes in construction, combination and arrangement of parts may be made without departing from the spirit and scope of my invention, as claimed.

Having thus described my invention, what I claim is:

1. A shield comprising a vertically arranged rectangular shaped plate having superimposed slots extending longitudinally thereof, an L-shaped bracket extending through one of the slots, bolts carried by the bracket and extending through the other slots to adjustably connect the plate to the bracket whereby said plate may be adjusted longitudinally with respect to the bracket, and means for securing the bracket to a bumper of an automobile.

2. A shield comprising a vertically arranged rectangular shaped plate having superimposed slots extending longitudinally thereof, an L-shaped bracket extending through one of the slots, bolts carried by the bracket and extending through the other slots to adjustably connect the plate to the bracket whereby said plate may be adjusted longitudinally with respect to the bracket, a fastener carried by and depending from the bracket, tubular elements slidable on said last-named fastener, and hook-shaped elements on the tubular elements to grip therebetween a support.

DAVID E. WILLETT.